Aug. 17, 1971     J. M. CLAPTON ET AL     3,600,156

RECOVERY OF MERCURY FROM CINNABAR

Filed Aug. 9, 1968

INVENTORS.
Jefferson M. Clapton
Donald K. McCready

BY Van Valkenburgh & Lowe

ATTORNEYS

Aug. 17, 1971    J. M. CLAPTON ET AL    3,600,156

RECOVERY OF MERCURY FROM CINNABAR

Filed Aug. 9, 1968    2 Sheets-Sheet 2

INVENTORS.
Jefferson M. Clapton
Donald K. McCready
BY *Van Valkenburgh & Lowe*

ATTORNEYS

United States Patent Office 3,600,156
Patented Aug. 17, 1971

---

3,600,156
RECOVERY OF MERCURY FROM CINNABAR
Jefferson M. Clapton, Denver, Colo., and Donald K. McCready, Riverton, Wyoming, assignors to Jefferson M. Clapton, Denver, Colo., and Donald K. McCready, Riverton, Wyoming, jointly
Filed Aug. 9, 1968, Ser. No. 751,427
Int. Cl. C32b 43/00
U.S. Cl. 75—101                                  10 Claims

ABSTRACT OF THE DISCLOSURE

The production of mercury from an ore containing cinnabar. The first portion consists in comminuting the ore and leaching the ore and by dissolving the cinnabar in a sodium sulphide solution in the presence of an hydroxyl ion, provided by calcium hydroxide. The pregnant solution subsequently obtained is removed from the ore and is thereafter treated by passing the same through one or more towers containing vertically disposed arrays of strands of aluminum wire, or other elongated structural forms. The formation of hydrogen by reaction of the hydroxyl ion with aluminum and the reduction of the mercury to its metallic form, occurs with the mercury adhering to the vertical strands of wire to migrate downwardly therealong. A mercury, sufficiently pure as to require no further treatment will fall from the bottom ends of the strands as drops of substantial size. It was found that aluminum suitable for this purpose had to have less than 4 percent impurities to insure that the mercury will adhere.

---

This invention relates to methods and apparatus for the recovery of mercury from cinnabar, and more particularly to the recovery of mercury from its ores by the use of a sodium sulphide leach.

The common and accepted mode for the treatment of mercury ore, cinnabar, is to vaporize the mercury in a retort and to collect the condensate in cooling tubes. This method of refining has certain limitations and a better system has been desired for a long time. In the first place, the ore must be of sufficient grade before it can be used for retorting, and thus, the low grade ores of many mines and in many dumps cannot be profitably worked. Another problem which concerns the retorting of mercury lies in the fact that great care must be exercised to prevent workmen from being poisoned by the mercury fumes.

Leaching and precipitating operations have heretofore been proposed and used to a limited extent to supplant, and to supplement such retorting operations, but none to date have been especially successful. One such leaching operation is based upon the ability of an alkaline sodium sulphide solution to dissolve cinnabar. Subsequently, metallic mercury is recovered as a precipitate in the presence of aluminum. This is possible by carrying the sodium sulphide in an alkaline solution for the hydroxyl ions to react with the aluminum to release nascent hydrogen which, in turn, reduces the dissolved mercury to its metallic form. The reactions producing the solution and controlling this reduction are generally as follows:

(1) To dissolve cinnabar:

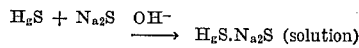

(2) To form hydroxyl ion and produce hydrogen by reaction of the hydroxyl ion with aluminum:

$$NaOH \rightarrow Na^+ + OH^-$$

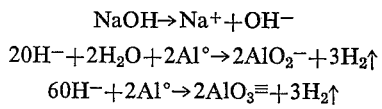

(3) To reduce the mercury to its metallic state:

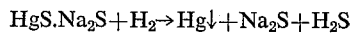

In conventional processes, a mercury-aluminum amalgam has been produced by the above reactions, using aluminum of a high-purity type which is available as a powder, shot or granules. However, to date it has been found that the process is not fully satisfactory and is not economical for several reasons. For example, it has been observed that as much as 35 pounds of sodium sulphide have been required to treat a ton of ore of a comparatively low-grade, containing approximately 6 pounds of mercury per ton. The theoretical amount of sodium sulphide for such treatment of such ore should be approximately 2 pounds per ton of ore, and further, the reactions listed above show that the hydrogen reduction should reconvert the sodium mercuric sulphide to sodium sulphide to render it available for reuse. Actually, past experience has shown an increase of sodium sulphide concentrations during precipitation. Clearly, some other reaction occurs to cause this excessive consumption of sodium sulphide and it is believed that the major portion of the reagent loss occurs from an oxidation reaction changing the sodium sulphide to sodium sulphate.

As a second undersirable feature of conventional systems, the batch precipitation procedures, using comparatively expensive, reagent grade powdered or granular aluminum, require large vessels, long precipitation times and considerable handling by plant operators resulting in excessive costs. Furthermore, impurities, and especially the formation of soluble oxides of aluminum, become a serious problem for they restrict the life of the solution and limit the number of times it may be reused. Also, whenever the sodium hydroxide solution leaches silicate ions from the gangue of the ore which is being treated, the silica will subsequently precipitate in the equipment as undesirable crusts during exposure to the reducing environment present in the precipitation vessels. Also, a certain amount of the mercury will precipitate from the solution as a black sulphide.

Finally, the mercury forms an amalgam with the granulated or powdered aluminum in the approximate proportions of 95% mercury and 5% aluminum, by weight, requiring the final product to be retorted or otherwise refined before the mercury is sufficiently pure for marketing.

It follows that there is a definite need for an improved, more economical method for the recovery of mercury from its ores and especially, for the recovery of mercury from its low grade ores which may be found in many mines which are at present uneconomical to work. There exists also, extensive dumps and tailing piles at many mercury mines located in the United States, Mexico, Spain and Italy which have mercury ore in low grade concentrations.

The present invention was conceived and developed with such a need in view and comprises refinements over the conventional leach-precipitate method using sodium sulphide as the leaching ingredient and aluminum as the reducing agent. In the first place, the present invention combines a closed, and preferably, counter-current flow system for the reduction of the resulting pregnant solution. The second improvement involves the discovery that calcium hydroxide can provide an adequate concentration of hydroxyl ions even though it is limited in its solubility. Not only is it much cheaper than sodium hydroxide, but the calcium ions will precipitate, for easy removal at selected locations, the aluminates and other impurities which would otherwise tend to build up in the system.

The provision of a closed system under pressure permits a more effective use of the hydrogen which is generated by the reaction of the aluminum. Furthermore, the excess hydrogen which is produced, may be collected in the closed system and directed into that portion of the system where leaching commences. It was discovered that the hydrogen atmosphere in the leach tanks inhibits the sodium sulphide from oxidizing into sodium sulphate, and thereby preserves the solution for recycling with a minimum loss of reagents.

A fourth improvement involves the discovery that aluminum, preferably in the form of wire but also in any other elongated structural form, can be arranged to provide for the necessary reaction. In such an arrangement, the wires will be extended vertically, or nearly so, and pregnant solution will move along the wire to react therewith. The metallic mercury will congeal to the wire as it is reduced, but without a complete amalgamation therewith and instead, will flow downwardly on the wire to drop therefrom into a collection pool. As a result of the failure of a complete amalgamation to occur, mercury can be recovered which is sufficiently pure, as to be marketable without further treatment.

It follows that the objects of the invention are to provide a novel and improved process and apparatus for the recovery of mercury wherein a practical, economical leach-precipitation system is possible which can effectively and economically treat both low grade and high grade ores with a minimum loss of reagents; which produces a salable final product having a high degree of purity without the necessity for subsequent retorting operations; which provides for a continuous flow of the ore and the reduction of the enriched solutions leached therefrom to produce a maximum recovery of mercury in a minimum time period; and which provides steps, operations and sequences which can be easily controlled and regulated by technicians of ordinary skill.

With the foregoing and other objects in view, the present invention consists of certain operations, sequences and steps, and constructions, combinations and arrangements as hereinafter described, defined in the appended claims and illustrated in preferred embodiment in the accompanying drawing in which:

Figure 1:
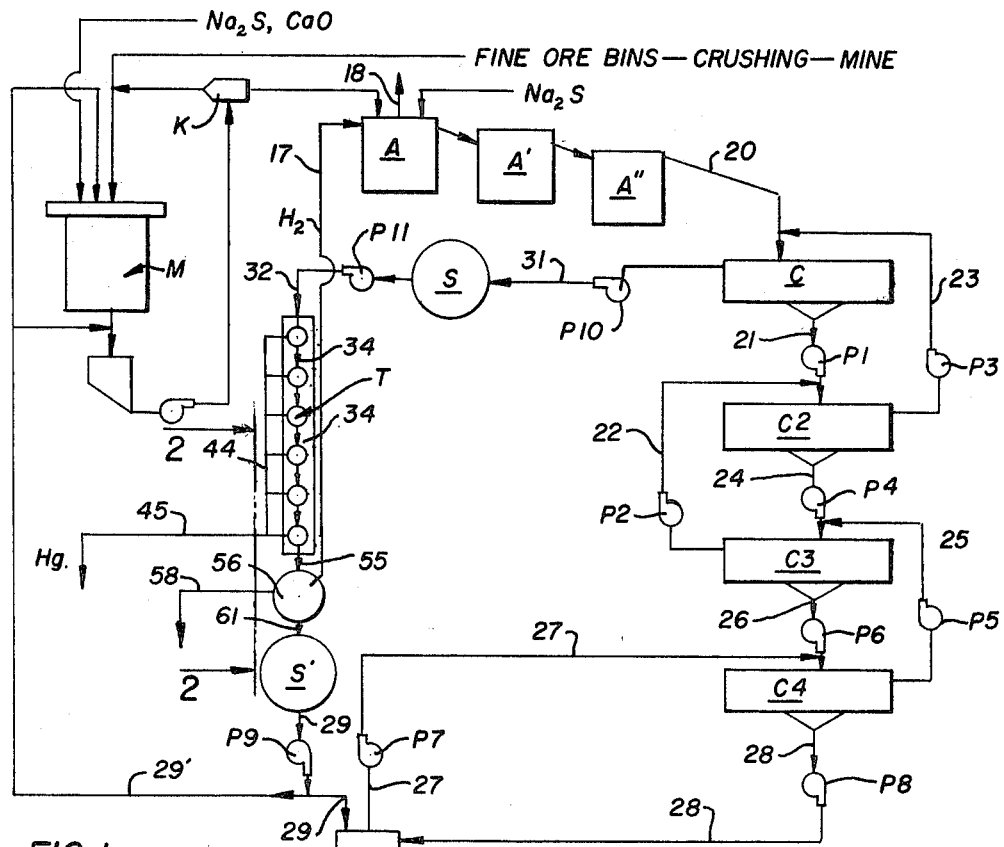
FIG. 1 is a diagrammatic chart symbolical of one counterflow system wherein mercury ore moves from the mine and to the tailings dump while the reagent solution circulates in an opposite direction to leach out the mercury ore and subsequently precipitate the mercury as the solution is being regenerated.

Referring more particularly to the drawing, FIG. 1 is illustrative of one of several arrangements of apparatus and operations which may be used in the recovery of mercury from its ore by a solution process in accordance with the present invention. The invention will thus be exemplified by a description of the process using this arrangement.

The initial preparation of the ore, which may come from a mine or from a tailings dump, requires that it be first crushed and stored, as in bins, until it is ready for use. The ore is then moved from the bins and to a ball mill M where it is ground to a fineness of approximately minus 20 mesh, or finer, and to a grind which is sufficient for it to blend with water as a pulp so it may be pumped from one tank to the next. It is to be noted that the ore need be ground only to a fineness which is sufficient to facilitate such movement as a pulp because the cinnabar is easily dissolved. To provide a proper sizing, the mill will include a classifier K in its grinding circuit. The discharge from the ball mill M is through a pump P11 to the classifier K. The classifier moves material ground to pulp size to an agitator A, hereinafter described, and returns oversized material to the ball mill M along with the ore moving into the ball mill. Water constituting a barren solution, hereinafter described, is provided in the ball mill and in the line extending from the ball mill to the pump in any desirable amounts, this operation being essentially conventional and such amounts may be easily controlled by a skilled operator.

While in the mill, the ore is mixed with suitable amounts of sodium sulphide, barren solution and calcium oxide to attain a selected pH and to begin the leaching of the discharged pulp. As the pulp flows from the mill and into a first agitator A, the pulp is mixed with additional amounts of sodium sulphide solution and the first step of the operation is to leach the ore to dissolve the cinnabar in this agitator A and in other agitators A' and A" arranged in tandem. If necessary, additional sodium sulphide may be added to these agitators.

Figure 6:
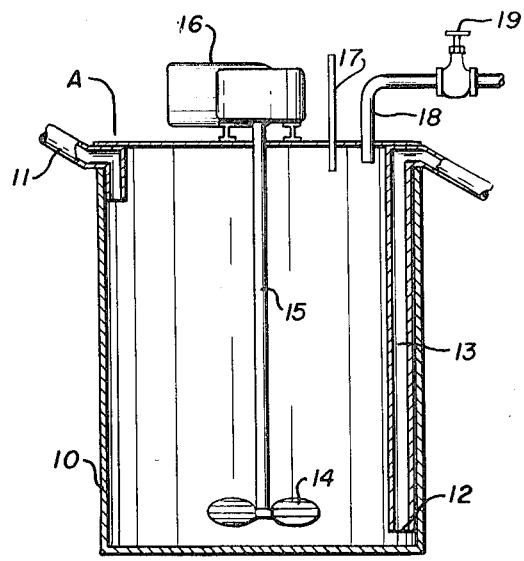
FIG. 6 is a sectional view, somewhat diagrammatic in its arrangement, illustrative of one form of a container wherein the ore is agitated and leached.

The construction of a suitable type of agitator is illustrated at FIG. 6. This unit is preferably a closed tank 10 having an inlet 11 at the top, at one side, and an outlet 12 at the bottom, at the opposite side thereof. This outlet, however, extends upwardly within the tank as a conduit 13 to effect discharge at a level which will provide for a sufficient removal of the coarse solids as the pulp flows from one unit to the next, the conduit line 13 of one tank joining with the intake line 11 of the next. The agitator is an impeller 14 which is mounted upon a central shaft 15 in the tank and a motor 16 at the top of the tank drives the shaft. Rotation of the impeller will stir the pulp to keep it in a fluid suspension and permit easy flow from one agitator to the next in sequence.

The barren sodium sulphide solution will contain only a small amount of mercury which results from washing leached ore pulp as hereinafter described. However, as agitation continues, the cinnabar is effectively leached from the ore to form a pregnant solution by the time it passes through the third and the final agitator A". The actual number of such agitators which may be used is a matter of choice depending upon the nature of the ore, the amount of ore to be handled per day and the length of time the ore is permitted to remain in each unit.

An additional feature in the agitators is a hydrogen supply line 17. An excess of hydrogen is produced by the reaction of the hydroxyl ions with aluminum as hereinafter further described, and in the present invention, the excess hydrogen is advantageously used to inhibit oxidation of the sodium sulphide. Since the system herein described is preferably a closed system, the undesirable introduction of oxygen will occur primarily as the ore is fed into the first leaching agitator A. By directing the hydrogen intake line into the tank 10, the hydrogen establishes a reducing environment which was found to help preserve the sodium sulphide. The hydrogen may be permitted to escape from the tank at the top outlet 18 and a pressure control valve 19 can be used to regulate this movement or release.

Following this basic leaching operation which will dissolve as much as 98% of the mercury in the ore, the pregnant solution and pulp extend as from a line 20 to a thickener C where the pregnant solution is separated from the pulp and diverted to a surge tank until it is ready to be passed through reducing towers as will be hereinafter described.

The thickener C can be one of several conventional types of filters, thickeners or cyclones which will effect a partial separation or filtration of the pulp, retaining only enough liquid to render the pulp sufficiently fluid for pumping so it can be removed. Such a filter may be of a continuous or intermittent type, but for purposes of establishing a smooth counterflow action, it is preferable that thickeners be used for a continuous operation.

After the pulp is removed from the thickener C, it is repeatedly washed by an advancing low grade solution which flows primarily from the succeeding thickeners and reducing towers. The solution flow is in opposition to the movement of the ore, with each washing picking up a small concentration of mercury during dilution of the passing pulps and finally mixing with the pregnant solution and pulp coming from the final agitator A″ to the thickener C.

The pulp and a small amount of pregnant solution is removed from the thickener C through a line 21 by a pump P1 and at the same time, a substantial amount of low grade solution is supplied to line 21, through a feed line 22 by a pump P2. The resulting pulp flows into a washing thickener C2. In this thickener C2, most of the solution is separated from the pulp and is directed to the first thickener intake through a line 23, as by pump P3.

The remainder of the solution stays with the pulp to form a thick pulp which is directed through a line 24 by a pump P4 and at the same time, additional low grade solution is supplied to line 24 through a feed line 25 by a pump P5. The resulting pulp flows into a third washing thickener C3. In this thickener C3, most of the solution is separated from the pulp and is directed to the intake of the second mentioned thickener through the aforementioned feed line 22.

The remainder of the solution stays with the pulp to form a thick pulp which is directed through a line 26 by a pump P6 and at the same time, additional low grade solution is supplied to line 26 through a feed line 27 by a pump P7. The resulting pulp flows into a fourth washing thickener C4. In this thickener C4, most of the solution is separated from the pulp and is directed to the third mentioned thickener through feed line 25.

The remainder of the solution stays with the pulp to form a thick pulp which is directed through line 28 by a pump P8 to a final wash filter W. At the same time, barren solution is pumped, by a pump P9 to this filter through a line 29 which is supplied directly from a surge tank S′. Most of the solution is then separated from the pulp and is directed thence to the fourth mentioned thickener through the aforementioned feed line 27. Also, another branch of line 29 will be directed to the grinding mill M as by line 29′.

After washing, the pulp is dumped on the tailings and some solution is necessarily lost in this manner. However, to minimize such loss, the pulp is flushed with a small amount of fresh water, as from a supply line 30 and flows thence, to the fourth thickener as through the discharge line 27. To compensate for the loss of fluid and reagents at the tailings discharge in this line 30, the fresh water wash volume may be regulated.

To complete the counterflow system, the pregnant solution from the thickener C is pumped, as by a pump P10, through a line 31 to a surge tank S where the solution may be stored. The solution is thereafter pumped as by a pump P11, through a line 32 to a series of reducing towers T. The line 32 terminates as the inlet 33 to the first tower, at the base of the tower. The line continues from the discharge 35 at the top of the tower as a connective section 34, which turns downwardly to the inlet 33 at the base of the next tower in the sequence, as in the manner illustrated at FIG. 2. The pregnant solution in these towers is held under pressure by the pump P11 to facilitate collection of the reduced mercury, as will be hereinafter explained.

Figure 2:
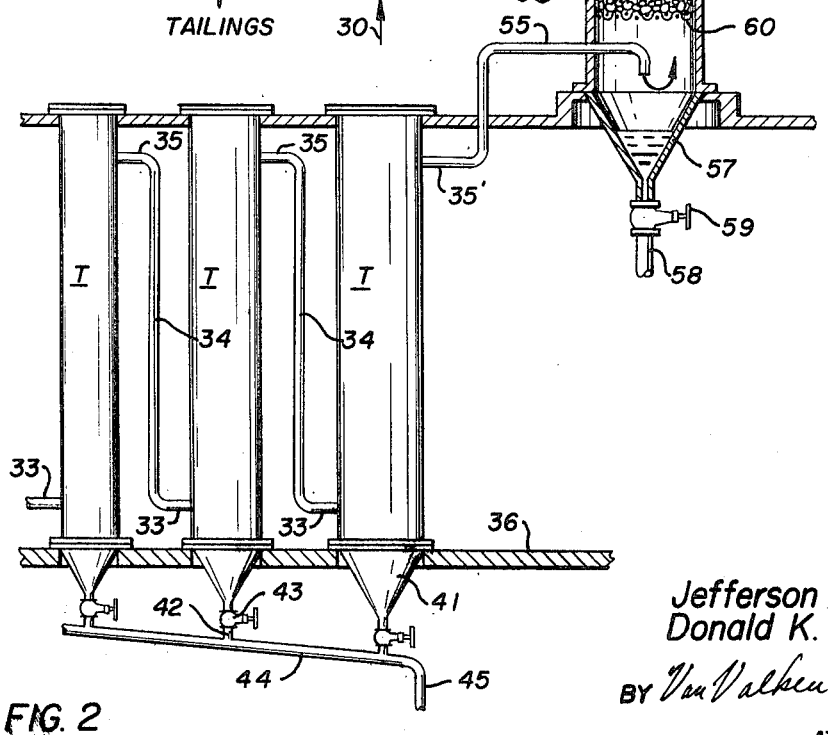
FIG. 2 is an elevational view of a portion of the components shown at FIG. 1, as indicated by the line 2—2 at FIG. 1, showing several mercury collection towers in tandem, and an aluminate precipitate collecting tank wherein the solution may be cleaned of impurities.

The flowsheet illustrates six towers T arranged in this manner, in series, and they are mounted in a row as upon a suitable framework 36 as illustrated at FIG. 2. Each tower is of substantially the same construction as the others except that it is desirable for the towers to increase in diameter from a minimum diameter at the first tower to maximum diameter at the last tower to produce a progressively reduced velocity flow as the solution passes from one tower to hte next. Although six towers are illustrated at FIG. 1, it is to be understood the number and size of the towers actually used, may be varied at any specific installation.

Figure 3:
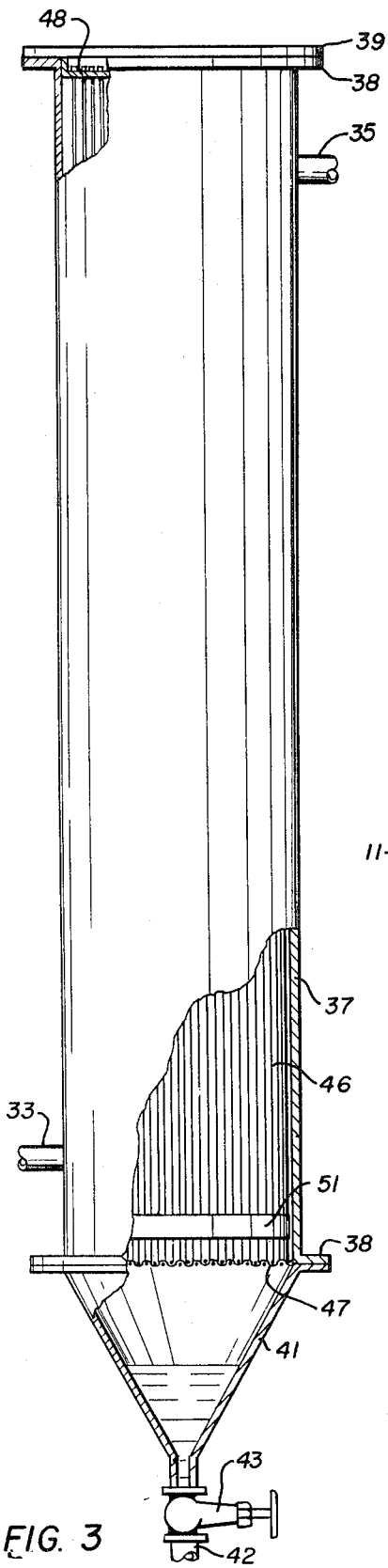
FIG. 3 is an elevational view of one of the towers shown at FIG. 2, but on an enlarged scale and with portions broken away to better illustrate the structure thereof.
Figure 4:
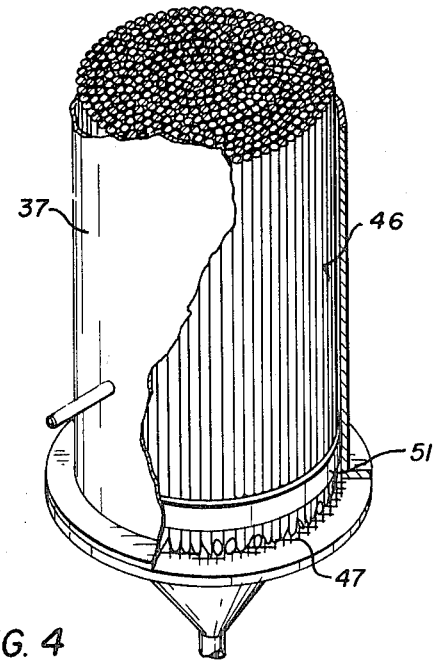
FIG. 4 is a fragmentary, isometric view of a portion of the tower shown at FIG. 3, but on a further enlarged scale to better indicate one manner in which rods of aluminum wire may be placed in the tower.

The construction of a single tower is illustrated at FIGS. 3 and 4. Each tower T is formed as a vertically disposed cylindrical shell 37 having end flanges 38 to facilitate its connection with end closures. A cover 39 closes the top of the tower. An inverted collector cone 41 closes the bottom of the tower, and this collector cone includes a discharge line 42 extending below its bottom apex which is normally closed by a valve 43 in the pipe. The discharge line 42 of each tower is connected to a manifold 44, FIG. 2, which is arranged on a downward slope with its lower end turning downwardly as a spout 45 to permit mercury and other deposits in the cones 42 to be discharged into a suitable container, not shown.

In accordance with the present invention, an array of vertically disposed aluminum wire strands or rods 46 extend through each tower in a regular spacing pattern so that the solution flowing through the line 32, entering the tower from inlet 33 and being discharged from the discharge 35, will flow past these strands or rods. The strands or rods 46 may be supported in the tower in various ways, depending somewhat upon the closeness of the spacing desired. In FIGS. 3 and 4, the strands or rods are illustrated as being supported upon a screen 47 positioned at the base of the shell 37. Also, as an alternate and/or as a supplemental manner of supporting the strands or rods, they may be suspended from a plate 48 secured to the top of the tower. The upper ends of the strands or rods will extend through closely fitting holes 49 in the plate and the ends of these rods will be upset as at 50, as in the manner illustrated at FIG. 5. Where it is desirable to bunch the strands or rods close together, they may be held by a circumferential strap 51 as illustrated at FIGS. 3 and 4.

Figure 5:
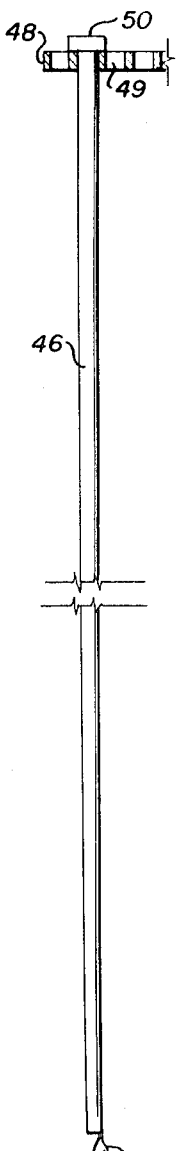
FIG. 5 is a fragmentary view of a single wire rod illustrating another manner of suspending the rod within the tower, with portions of the rod broken away to conserve space and with arrows symbolically indicating the manner in which the mercury is collected thereon and dispensed as a drop from its lower end.

These strands or rods 46 are adapted to react with hydroxyl ions in the solution to form nascent hydrogen which converts the sodium mercuric sulphide radical into metallic mercury as hereinbefore described. This action produces very fine droplets of mercury, commonly referred to as a mercury flour, and if these droplets are allowed to settle independently, they are very difficult to handle and to collect. The mercury flour must be retorted to obtain a commercially salable product. However, when rods of selected types of aluminum were used, as hereinafter further described, it was discovered that the mercury could be made to adhere to the aluminum strands or rods as it is reduced, and that it would flow downwardly along the strands or rods to form sizeable drops 52, as illustrated at FIG. 5, which could be easily recovered as a commercially salable product.

As the solution leaves the towers T, it is almost completely barren of mercury and it may then be prepared for recycling for the grinding, washing and leaching operations. The solution will contain soluble oxides of aluminum and other impurities. If these impurities and especially, the oxides of aluminum, are not removed from the solution, they will tend to build up in the solution and may adversely affect it after a few cycles of operation. However, with the use of calcium hydroxide as the hydroxyl-producing component, the oxides of aluminum can be precipitated as insoluble calcium aluminates during the mercury reduction reaction.

Accordingly, the discharge 35' of the last vessel T in the series is connected to a line 55 which is directed to a precipitate collection tank 56. This tank 56 is formed as a closed container having an inverted, conical base 57 from whence a drain line 58 extends, which is normally closed by a valve 59. It may be proportioned large enough to permit settlement of precipitates and may also include suitable filter screens 60. The flow of barren solution from the line 55 will extend through the tank 56 and past the screens 60 to be discharged from a line 61 which connects with the barren surge tank S' which, in turn, feeds the line 29 heretofore mentioned. Accordingly, flow of the barren solution through the tank 56 will allow the bulk of this precipitate of calcium aluminate and small amounts of mercury flour to be collected in the base 57 of the tank to be withdrawn from the system to line 58 whenever necessary.

The excess hydrogen which is generated in the precipitation towers will also flow into the collection tank 56 through the line 55. Thence, the hydrogen may be bled from a stub 40 at the top of the collection tank 56 and into the line 17. The line 17 extends to the first leaching agitator A as heretofore described.

The following example is illustrative of the system hereinabove described for reducing cinnabar to mercury according to the concepts of the present invention. This example is not an actual mill run, but is based upon pilot plant tests. However, to better correlate the results and to facilitate understanding of these pilot tests, the amounts of fluid and reagents used have been proportionately modified to base the same upon a throughput of ore of 100 tons per day.

An ore having 5.3 pounds of mercury per ton is treated in the pilot plant tests and the first step of the operation is to move the ore from storage bins to the grinder, the ball mill M. Based upon the 100 tons of throughput per day, this ore carries 7 tons of entrained moisture which constitutes part of the fresh replacement liquid to the system. In addition, 93 tons of barren solution is added at the mill, 65 tons to the mill directly and 28 tons to the classifier circuit of the mill to bring the total to 100 tons of liquid per day. It is to be noted that as much as 300 tons of ore will circulate through the grinding and classifying circuit, but the discharge into the leaching agitator is 100 tons of pulp and 100 tons of solution. Approximately 10 to 12 pounds of calcium oxide per ton of ore was added to the ore tested. The amount of calcium hydroxide will vary, depending upon the ore treated, and will be preferably a slight excess over that which will go into solution. The calcium oxide, which hydrolyzes to calcium hydroxide, is used to maintain a desired pH in the range of 10 to 12 to preserve the sodium sulphide in the solution. Sufficient sodium sulphide is also added at the mill, and/or at one or more of the leaching agitators A to provide for an optimum mercury extraction and to replace that which has been lost in the circuit. The amount varied from 40 to 60 pounds per ton for the ore tested, but this amount may vary for different ores and is easily regulated by mill control assays.

In passing through the mill and through the leaching agitators A, A' and A'' the solution is impregnated with 5.0 pounds of mercury per ton, while the concentration of cinnabar in the pulp is reduced to 0.3 pounds of mercury per ton. In addition to depositing the 100 tons of solution and 100 tons of pulp into the thickener C, 200 tons of solution having 0.95 pound of mercury per ton is added to thickener through line 23. The pulp moves from the thickener C to the thickener C2 through line 21 along with 82 tons of solution. The remaining 218 tons of mixed solution, having 2.30 pounds of mercury per ton, flows to the pregnant surge tank S.

As the pulp is pumped to the second thickener C2, 200 tons of solution having 0.39 pound of mercury per ton is added to the blend. The thickener C2 separates 200 tons of solution having 0.95 pound of mercury per ton which is returned to the thickener C1. At the same time, the pulp moves from the thickener C2 to the thickener C3 along with 82 tons of solution.

As the pulp is pumped to the third thickener C3, 200 tons of solution having 0.16 pound of mercury per ton is added to the blend. The thickener C3 separates 200 tons of solution having 0.39 pound of mercury per ton which is returned to the thickener C2. At the same time, the pulp moves from the thickener C3 to the thickener C4 along with 82 tons of solution.

As the pulp is pumped to the fourth thickener C4, 200 tons of solution having 0.06 pound of mercury per ton is added to the blend. The thickener C4 separates 200 tons of solution having 0.16 pound of mercury per ton which is returned to the thickener C3. At the same time, the pulp moves from the thickener C4 through line 28 to the washing filter W along with 82 tons of solution.

As the pulp is pumped to the washing filter W, 125 tons of barren solution from the surge tank S' is added to the blend. There is a further addition of 10 tons of fresh water for replacement. The washing filter W separates 200 tons of solution having 0.06 pound of mercury per ton which is returned to the thickener C4. At the same time, the pulp is washed by the fresh water, is moved to the tailings dump along with 17 tons of substantially barren solution and this completes the movement of ore and pulp through the system.

The movement of the solution through the system includes, in addition to the flow of solution to leach and wash the pulp, hereinabove described, a flow of 93 tons of barren solution from the tank S' to the ball mill M as through line 29', and the flow of 218 tons of pregnant solution is separated from the pulp at the thickener C which is passed through line 31 to the surge tank S. This 218 tons of pregnant solution is passed through line 32 and to the reducing towers T. There, the pregnant solution is stripped of mercury in these towers, and the solution thereafter is passed through the precipitate collection tank 56 and thence to the barren surge tank S'. As mercury is collected in the towers the valves 43 are opened to permit the same to flow through line 44, through discharge spout 45 and to a collection flask. The precipitate collecting tank is purged of precipitates at suitable intervals.

The metallic mercury is deposited upon aluminum wire strands 46 as it is reduced by nascent hydrogen. The manner in which the mercury adheres to the wires, or to other upright elongated aluminum structural members, is apparently an amalgamation of mercury and aluminum, but not an ordinary amalgamation where the mercury dissolved the aluminum. Apparently, the adhesion of mercury and aluminum is only a surface phenomenon, because the mercury will attach to the aluminum, but thereafter, it will migrate downwardly along the wire strand to collect at the bottom of the strand as sizeable drops which fall to the bottom of the tank to coalesce into a pool. The surprising and unexpected result is that the liquid mercury in the bottom of the tank has only a minute amount of aluminum and is sufficiently pure as to require no further refining to be salable as pure mercury. In the examples, the mercury recovered was 99.9+ percent pure.

This is in distinct contrast with prior batch operations where mercury is reduced by aluminum particles and the final product is a mercury-aluminum amalgam having approximately five percent aluminum which must be retorted. Moreover, the indication that no significant amalgamation occurs is borne out by the observation that the aluminum wires last a substantial length of time, and until they are eroded by the hydroxy ion reaction. By using vertical strands of wire or other elongated aluminum shapes to collect the mercury, it was found that the problem did not concern avoiding amalgamation, but avoiding the formation of minute droplets of mercury commonly referred to as mercury flour. If the reactions which reduce the sodium mercury by sulphide are not at the surface of the aluminum so that the metallic mercury can adhere thereto, the mercury flour will form. These minute droplets are very undesirable because they will not coalesce into a liquid and they are so small that they will not easily settle to the bottom of the tank in spite of their high specific gravity.

It was found that this flour could be avoided by controlling the hydrostatic pressure within the reduction towers T and by using a comparatively pure aluminum. When the towers T were operating at normal atmospheric pressure, an undesirable amount of mercury flour was present. However, the vertical strands of aluminum would collect mercury quite effectively when the system was operated under pressure. The tests indicated that the amount of mercury flour present was reduced significantly whenever the pressure in the towers was approximately ten pounds per square inch above normal atmospheric pressure. By increasing the pressure to a range of from 20 and 30 pounds per square inch, gauge pressure, the amount of flour was not significant. The tests indicated that higher pressures would also give satisfactory results, but ordinarily, such higher pressures would not be practical in structures such as the reducing towers T.

The purity of the aluminum strands was also found to be a significant factor in controlling the formation of mercury flour. In previously known batch operations, where an amalgam of mercury and aluminum was obtained, a reagent grade of aluminum was used to reduce the mercury. With the use of vertical strands of aluminum wire, rods and bars, as in the arrangement herein disclosed, tests were made with both reagent grade wires and commercial wires. When the reagent grades of wires were used as the vertical strands as herein disclosed, they functioned satisfactorily and did not create any significant amount of mercury flour. The reagent grade aluminum wire, contrary to predictions, collected and dropped the mercury without being amalgamated in such a manner as to be unduly eroded or to lose its structural strength. The commercial, less expensive and more easily obtainable types of aluminum wire, rods or similar structural shapes were far more practical for field use. However, while some types of commercial aluminum wires and rods appeared to function satisfactorily, other types did not do so and when tested, produced an excess of mercury flour.

It was found that commercially available aluminum wire, usually alloyed with small amounts of other metals, would hold the mercury if the aluminum content was greater than approximately 96 percent, by weight. It was discovered, however, that impurities and alloying ingredients, especially silicon, copper and magnesium would cause flouring as these impurities or metals were increased in amount. For example, the aluminum alloy #2011, containing approximately 0.4% silicon, 0.70% iron, 5 to 6% copper, 0.30% zinc and 0.15% of other impurities would not hold the mercury, but would cause the undesirable mercury flour along with sulphide precipitates of copper, zinc and other impurities. In aluminum wires and structural forms having approximately 98% aluminum, by weight, such as alloy #1100 containing 1% silicon and iron, 0.2% copper, 0.05% manganese, 0.1% zinc and 0.15% other impurities, held the mercury without significant flouring.

The tests concerning the purity of aluminum could not be extended because of the unavailability of the different types of aluminum and especially, because commercial aluminum was available with the aluminum content being 98 percent or higher and a number of grades of commercial aluminum were available, the aluminum content being 94 percent or less, with no commercial grades of aluminium in an intermediate range. A blend of grades would suggest that an aluminum content of approximately 96 percent was the least which could be used in the present invention. It was observed, however, that a simple test was possible to determine whether or not a selected commercial aluminum strand could be used for the process. A useable type of aluminum can be wetted with the mercury by rubbing mercury upon a clean surface of the aluminum.

We have now described our invention in considerable detail. However, it is obvious that others skilled in the art can build and devise alternate and equivalent constructions which are nevertheless within the spirit and scope of our invention. Hence, we desire that our protection be limited, not by the constructions illustrated and described, but only by the proper scope of the appended claims.

We claim:

1. In a process for reducing cinnabar to obtain metallic mercury therefrom, wherein the cinnabar is dissolved in an aqueous solution of sodium sulphide in the presence of hydroxyl ions to produce a pregnant solution which may be subsequently reduced in the presence of aluminum by hydrolysis of the aluminum to create nascent hydrogen to thereby reduce the merucury to the metallic state, the improvement which consists of the step of:
    exposing the pregnant solution to an elongated member of aluminum having an aluminum content greater than 96% by weight and wherein the member is inclined at a pitch approaching the vertical, whereby mercury collecting on the surface thereof will flow to the lower end of the member to form drops which fall off the member and;
    the further step of collecting the mercury drops.

2. In the process defined in claim 1, wherein a plurality of elongated aluminum members are provided and are arrayed in spaced parallelism in a substantially vertical alignment.

3. In the process defined in claim 1, including a plurality of said members formed as rods arrayed in spaced parallelism and inclined at a pitch approaching the vertical.

4. In the process defined in claim 1, wherein the hydroxyl ion is produced by calcium hydroxide.

5. In the process defined in claim 1, including the step of applying pressure to the solution as it flows past said aluminum member.

6. In the process defined in claim 5, wherein the pressure is in excess of 10 pounds per square inch.

7. The process of recovering merucury from ore containing gangue and merucuric sulphide wherein:
    comminuted ore is blended with a solution of sodium sulphide in the presence of hydroxyl ions whereby to effect a reaction with sodium sulphide and to bring the mercuric sulphide into solution as sodium mercury bisulphide; the solution is then separated from the gangue; the solution is then exposed to aluminum to effect hydrolysis and to create nascent hydrogen to thereby reduce the mercury to the metallic state, the improvement wherein:
    the aluminum is formed as an elongated member inclined at a pitch approaching the vertical;
    the aluminum is an alloy having an aluminum content greater than 96%, by weight, whereby metallic mercury will accumulate upon the surface of the aluminum and flow downwardly along the surface to form drops of mercury which will fall therefrom; and
    collecting the mercury drops from the member.

8. In the process defined in claim 7, wherein the hydroxyl ion is produced by introducing calcium hydroxide into the solution.

9. In the process defined in claim 7, wherein the aluminium is a commercial type having a small amount of alloy therein and is characterized by the property of being wetted by metallic mercury.

10. In the process defined in claim 7, wherein the process is continuous and wherein the hydrogen generated during the reaction of accumulating mercury upon the aluminum member is introduced to the solution during the step of blending the ore, whereby to produce a reducing environment to inhibit oxidation of the sodium sulphide solution therein.

References Cited
UNITED STATES PATENTS

| | | | |
|---|---|---|---|
| 1,119,377 | 12/1914 | Thornhill | 75—121 |
| 1,323,588 | 12/1919 | Gordon | 75—109 |
| 1,762,861 | 6/1930 | Glaeser | 75—121 |

L. DEWAYNE RUTLEDGE, Primary Examiner

G. T. OZAKI, Assistant Examiner

U.S. Cl. X.R.

75—109, 121; 266—22